United States Patent
Wang et al.

(10) Patent No.: US 12,108,229 B2
(45) Date of Patent: Oct. 1, 2024

(54) MODIFICATION OF AUDIO SIGNALS BASED ON AMBIENT NOISE COLLECTED BY SPEAKERS

(71) Applicant: HEWLETT-PACKARD DEVELOPMENT COMPANY, L.P., Spring, TX (US)

(72) Inventors: Chin-Yu Wang, Taipei (TW); Bing-Hao Cheng, Taipei (TW); Kuang-che Teng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 135 days.

(21) Appl. No.: 17/914,451

(22) PCT Filed: Apr. 29, 2020

(86) PCT No.: PCT/US2020/030460
§ 371 (c)(1),
(2) Date: Sep. 26, 2022

(87) PCT Pub. No.: WO2021/221631
PCT Pub. Date: Nov. 4, 2021

(65) Prior Publication Data
US 2023/0121400 A1    Apr. 20, 2023

(51) Int. Cl.
*H04R 3/12* (2006.01)
*G06F 3/16* (2006.01)
(Continued)

(52) U.S. Cl.
CPC .............. *H04R 3/12* (2013.01); *G06F 3/162* (2013.01); *H04R 1/028* (2013.01); *H04R 1/08* (2013.01);
(Continued)

(58) Field of Classification Search
CPC . H04R 3/12; H04R 1/028; H04R 1/08; H04R 1/403; H04R 29/002;
(Continued)

(56) References Cited

U.S. PATENT DOCUMENTS 9,407,991 B2 * 8/2016 Melanson ................. H04R 3/04
9,973,870 B2   5/2018 Ben-Ami et al.
(Continued)

FOREIGN PATENT DOCUMENTS

CN    103841491 A    6/2014
CN    110446146 A    11/2019
(Continued)

OTHER PUBLICATIONS

Dmitrievich, A, G., et al., "Using headphones to implement a technical channel for the leakage of voice information," Ural Symposium on Biomedical Engineering, Radioelectronics and Information Technology, Jun. 14, 2018, pp. 229-232.
Guri, M., et., "Speak(a)r: Turn Speaker to Microphones for Fun and Profit," Cyber Security Research Center, Nov. 22, 2016, pp. 17.

*Primary Examiner* — Andrew Sniezek
(74) *Attorney, Agent, or Firm* — Quarles & Brady LLP

(57) ABSTRACT

In examples, an electronic device comprises a first speaker port, a second speaker port, and storage comprising a first port attribute corresponding to the first speaker port and a second port attribute corresponding to the second speaker port. The storage comprises executable code. The electronic device comprises a processor coupled to the first and second speaker ports and the storage. The processor, upon executing the executable code, is to collect ambient noise data using a first speaker corresponding to the first speaker port in response to the first port attribute indicating that the first speaker is to be used as a microphone and the second port attribute indicating that a second speaker corresponding to the second speaker port is to be used as a speaker. The (Continued)

processor is to modify an audio output signal using the ambient noise data collected using the first speaker. The processor is to provide the modified audio output signal to the second speaker port.

15 Claims, 6 Drawing Sheets

(51) Int. Cl.
  *H04R 1/02* (2006.01)
  *H04R 1/08* (2006.01)
  *H04R 1/40* (2006.01)
  *H04R 29/00* (2006.01)
(52) U.S. Cl.
  CPC ........... *H04R 1/403* (2013.01); *H04R 29/002* (2013.01); *H04R 2400/01* (2013.01); *H04R 2400/11* (2013.01); *H04R 2410/05* (2013.01); *H04R 2499/15* (2013.01)
(58) Field of Classification Search
  CPC ............ H04R 2400/01; H04R 2400/11; H04R 2410/05; H04R 2499/15; G06F 3/162
  See application file for complete search history.

(56) References Cited

U.S. PATENT DOCUMENTS

| | | |
|---|---|---|
| 10,225,653 B2 | 3/2019 | Melanson et al. |
| 2003/0118201 A1 | 6/2003 | Leske et al. |
| 2006/0023870 A1 | 2/2006 | Stenmark |
| 2007/0124571 A1 | 5/2007 | Alperin et al. |
| 2011/0181452 A1 | 7/2011 | Raifel et al. |
| 2013/0005303 A1 | 1/2013 | Song et al. |
| 2013/0177163 A1 | 7/2013 | Hsiao |
| 2014/0126729 A1 | 5/2014 | Heiman et al. |
| 2015/0326960 A1 | 11/2015 | Niedermann et al. |
| 2016/0062729 A1 | 3/2016 | Amarilio et al. |
| 2017/0041724 A1 | 2/2017 | Master et al. |
| 2018/0357996 A1 | 12/2018 | Fink |
| 2019/0199846 A1 | 6/2019 | Rostaing et al. |

FOREIGN PATENT DOCUMENTS

| | | |
|---|---|---|
| CN | 110556131 A | 12/2019 |
| EA | 000929 B1 | 6/2000 |
| EP | 0847666 B1 | 3/1999 |
| JP | 64-073950 A | 3/1989 |
| JP | 06-051940 A | 2/1994 |

* cited by examiner

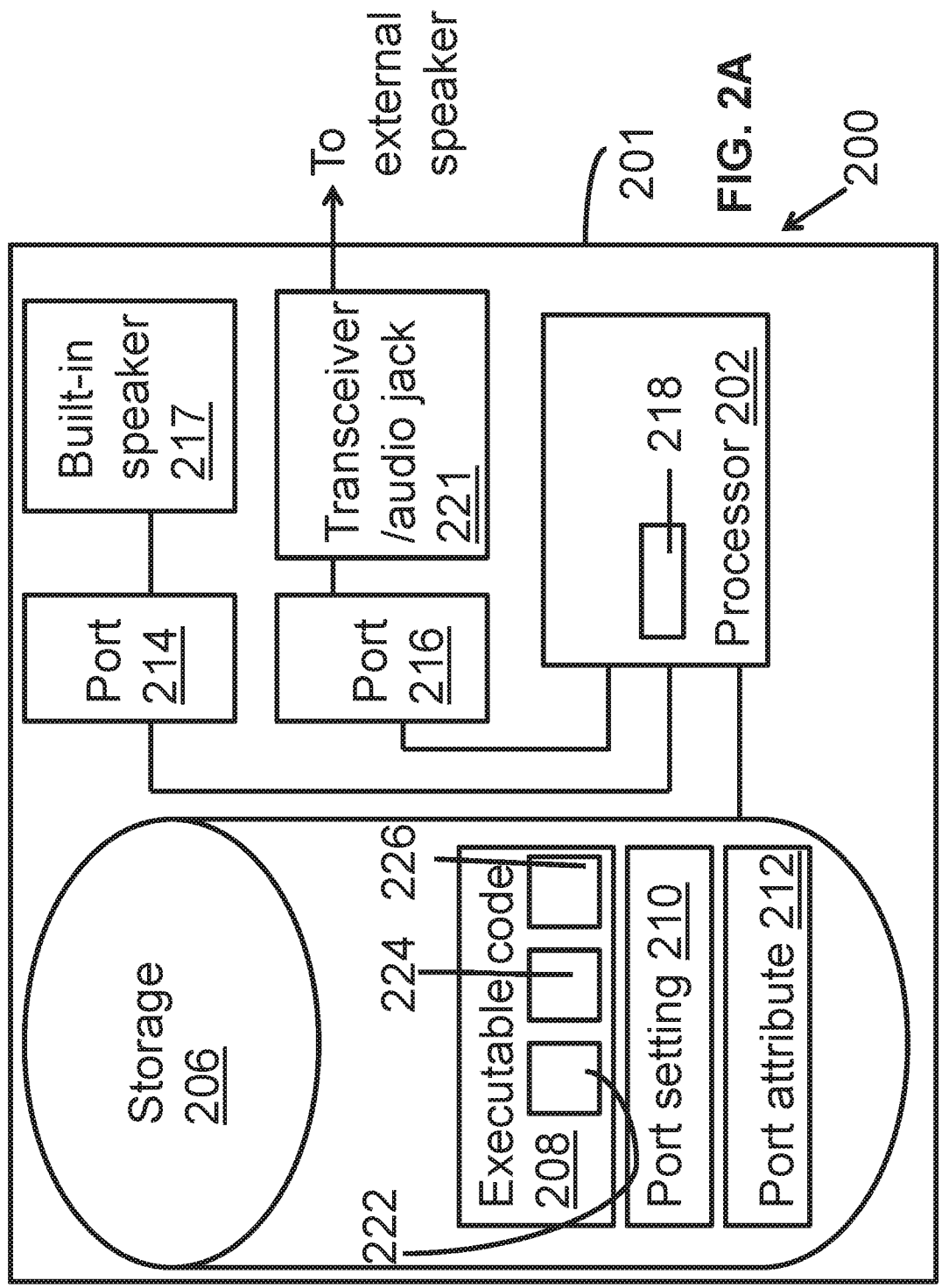

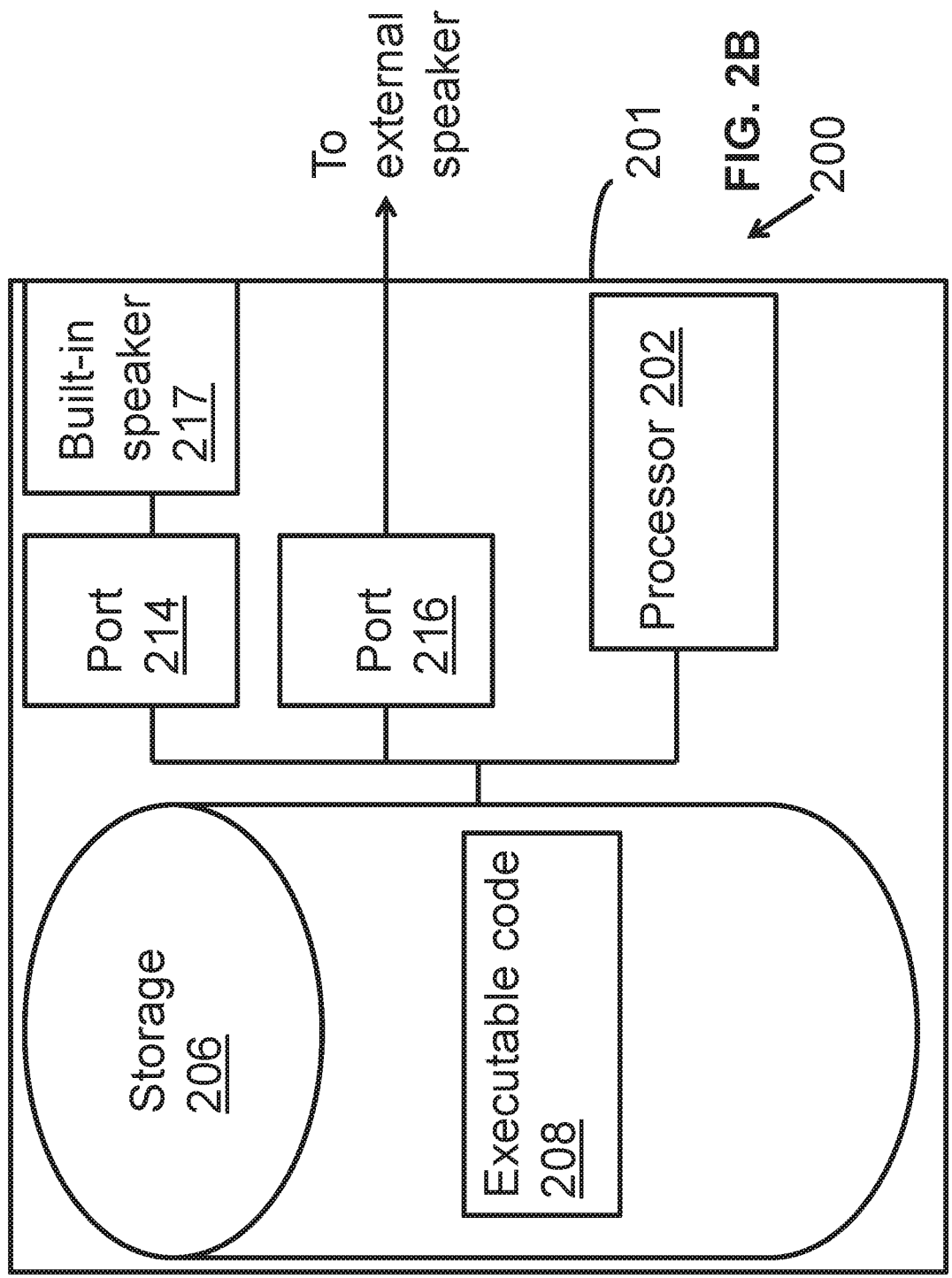

MODIFICATION OF AUDIO SIGNALS BASED ON AMBIENT NOISE COLLECTED BY SPEAKERS

BACKGROUND

Personal computers, such as laptop computers and notebook computers, often include a speaker that is built into the chassis of the computer. The speaker provides audio output, such as music, vocal communication from another person via a Voice Over Internet Protocol (VoIP) line, etc. For a variety of reasons, some computer users choose not to use such built-in speakers for audio output functionality, instead opting to use audio output peripherals. Examples of such audio output peripherals include external speakers, BLU-ETOOTH® headphones, ear buds, etc. that receive audio signals from the computer, either wirelessly or via an audio jack.

BRIEF DESCRIPTION OF THE DRAWINGS

Various examples will be described below referring to the following figures:

FIGS. 2A-2B depict electronic devices having access to built-in speakers and to external speakers, in accordance with various examples.

DETAILED DESCRIPTION

The sound quality provided by a speaker that is built into the chassis of a computer may be compromised by ambient noise. For example, a user who is enjoying music that is being played by a built-in speaker may suffer a poor listening experience if other people are carrying on a conversation nearby. The use of audio output peripherals, such as external speakers and ear buds, does not remedy this ambient noise challenge. The result is a computer that has at least two speakers (one built into the chassis and one external to the chassis), neither of which is able to adequately prevent ambient noise from negatively impacting the listening experience.

This disclosure describes a technique in which a computer that has access to at least two speakers uses one of the speakers as a microphone for detecting ambient noise. The computer then uses the detected ambient noise to correct the audio output signals provided to the other speaker. For example, a computer may have a built-in speaker and an external speaker connected to the computer via an audio jack. A built-in speaker, as used herein, is a speaker that is positioned within a housing formed in a computer chassis. An external speaker, as used herein, is a speaker that is positioned outside the computer chassis and that is communicably coupled to the computer via a wire or wirelessly. The user may choose to use the external speaker to listen to music and may leave the built-in speaker unused. In such a case, the computer may use the built-in speaker as a microphone, thereby using the built-in speaker to receive input audio (e.g., ambient noise of a conversation occurring nearby) rather than to provide output audio. The computer may then correct the audio output signals provided to the external speaker using the ambient noise of the conversation, for example, by increasing the amplitude (e.g., volume) of the audio output signals provided to the external speaker. In this way, a speaker that is otherwise unused is engaged for the useful and beneficial purpose of improving the user listening experience.

Figure 1A:
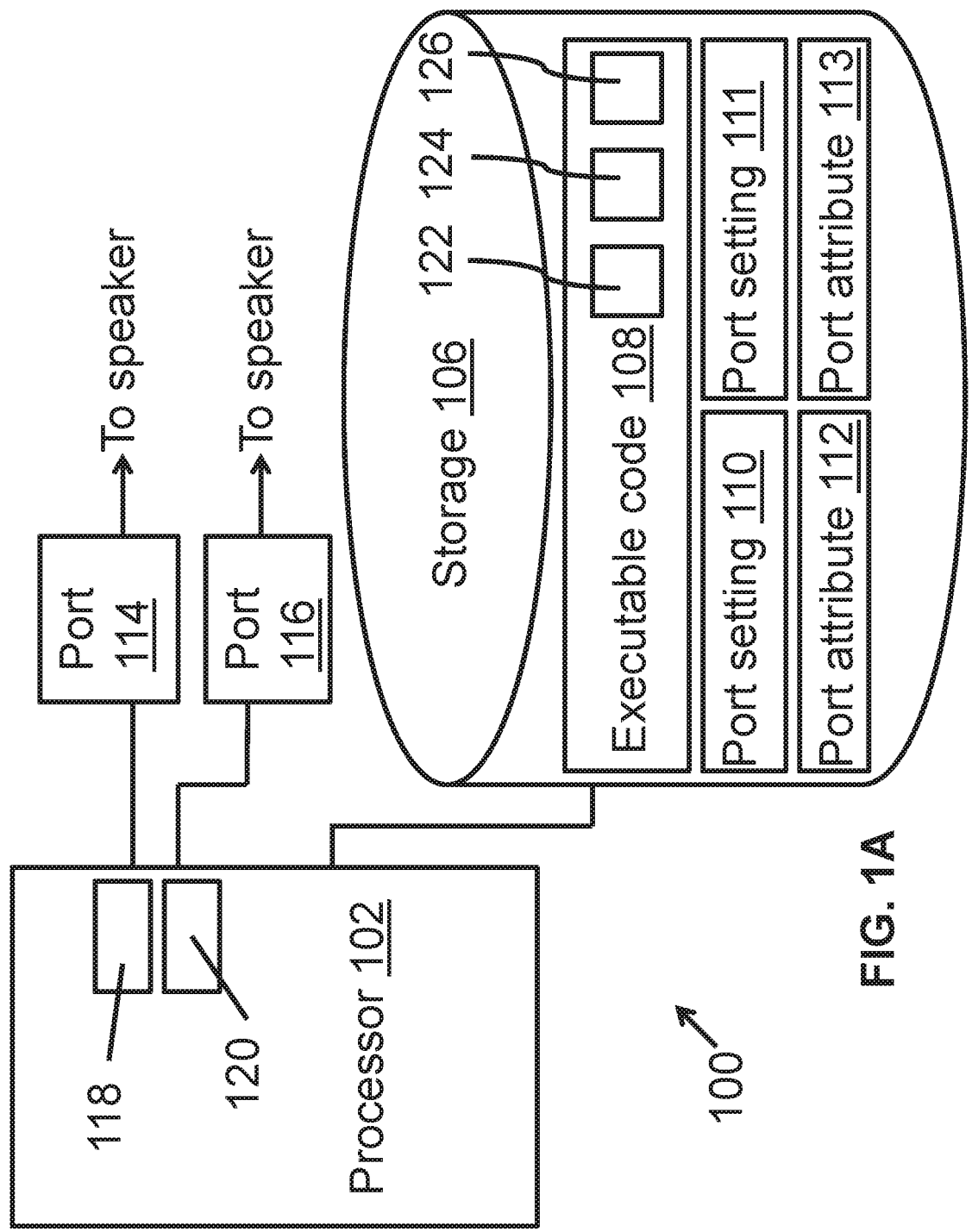
FIGS. 1A-1C depict electronic devices having access to multiple speakers, in accordance with various examples.

FIG. 1A depicts an electronic device 100, in accordance with various examples. The electronic device 100 may be, for example, a desktop computer, a laptop computer, a notebook computer, a mobile phone such as a smartphone, a television, a shopping checkout kiosk, a portable gaming console, or any other electronic device that has or can be adapted to have access to multiple speakers and that would benefit from improved sound quality. The remainder of this description generally assumes that the electronic device 100 is a laptop computer, but the scope of this disclosure is not limited as such.

The electronic device 100 comprises a processor 102, storage 106, and speaker ports 114, 116, In examples, the storage 106 comprises a single type of storage, such as a hard drive, random access memory (RAM, such as non-volatile (NV) RAM), read-only memory (ROM, such as serial peripheral interface (SPI) ROM), etc. In examples, the storage 106 represents a collection of different types of memory, such as a hard drive, RAM, or ROM, In examples, the storage 106 may be in a single location, and in other examples, the storage 106 may comprise a distributed memory, for example, memory within a chassis of the electronic device 100, memory external to but coupled to such a chassis, and/or memory accessible via the Internet, for example, on the cloud. In examples, the speaker ports 114, 116 comprise hardware ports via which the processor 102 may communicate with speakers. The speaker ports 114, 116 are bi-directional, meaning that the processor 102 may provide audio output signals to the speakers via the speaker ports 114, 116, and that the processor 102 may receive audio input signals from the speakers via the speaker ports 114, 116, The speaker ports 114, 116 may be configurable by programming port attributes, for example by modifying port attribute registers 118, 120, as explained in further detail below.

The storage 106 comprises executable code 108, port settings 110, 111, and port attributes 112, 113. In examples, the executable code 108 causes the processor 102 to perform some or all of the actions attributed herein to the processor 102 and/or to the electronic device 100. In examples, the executable code 108 includes a basic input/output system (BIOS) 122, an operating system (OS) 124, and an audio driver 126. The BIOS 122 includes executable code usable to perform a power on self-test (POST), which includes hardware initialization, testing, and configuration during the boot-up process. The BIOS 122 further includes executable code usable to launch a bootloader from a Master Boot Record (MBR), and to use the bootloader to launch the OS 124. After launching the OS 124, the BIOS 122 is usable to provide OS runtime services (e.g., communication with peripheral devices) for the OS 124 and applications. In examples, Unified Extensible Firmware Interface (UEFI) may be used in lieu of a BIOS 122. Like BIOS, UEFI includes executable code usable to perform hardware initialization, testing, and configuration during the boot-up process, to launch the OS 124, and to provide OS runtime services for the OS 124 and applications. However, UEFI employs globally unique identifier (GUID) partition tables (GPTs) in lieu of MBRs. For the sake of convenience and brevity, this disclosure uses the BIOS 122 (and the term BIOS generally) to refer to both BIOS and UEFI. An operating system comprises executable code that manages both hardware and executable code (e.g., applications) after a computer has booted up. In examples, when the electronic device 100 is powered on, the processor 102 executes the BIOS 122 and subsequently executes the OS 124 during a period known as OS runtime. During OS runtime, the processor 102 may execute various portions of the executable code 108, for instance, any of a variety of applications and drivers, including the audio driver 126.

As shown, the speaker port 114 communicates with a speaker, and the speaker port 116 communicates with a different speaker, Although two speaker ports are depicted, in examples, any number of speaker ports (and corresponding speakers) may be used, so long as the number is two or more. In examples, the speakers corresponding to the speaker ports 114, 116 are positioned inside a chassis of the electronic device 100. For example, the speakers may be built into a chassis of the electronic device 100. In examples, the speakers corresponding to the speaker ports 114, 116 are positioned external to the chassis of the electronic device 100. In examples, the speaker corresponding to the speaker port 114 is positioned within the chassis of the electronic device 100 and the speaker corresponding to the speaker port 116 is positioned external to the chassis of the electronic device 100. In examples, the speaker corresponding to the speaker port 114 is positioned external to the chassis of the electronic device 100 and the speaker corresponding to the speaker port 116 is positioned within the chassis of the electronic device 100. Any such variations are contemplated and included within the scope of this disclosure.

In examples, one or both of the speakers that communicate with the speaker ports 114, 116 is a wired speaker, meaning that the speaker has a hardwire connection to its corresponding port. In the case of an external speaker, this hardwire connection may take the form of a wire connecting to an audio jack built into the chassis of the electronic device 100. In examples, one or both of the speakers that communicate with the speaker ports 114, 116 is a wireless speaker, meaning that the speaker has a wireless connection to its corresponding port. In the case of an external speaker, this wireless connection may be, e.g., a BLUETOOTH® connection.

During operation, it is assumed that one of the speakers is used as a speaker and that the other speaker is unused. For instance, an external speaker may be used to play music and a built-in speaker (built into the chassis of the electronic device 100) may be unused. In such cases, the user may configure the unused speaker to operate as a microphone as described in more detail below. Accordingly, the electronic device 100 receives ambient noise data via the unused speaker that is being operated as a microphone, and the electronic device 100 uses the ambient noise data to modify the audio output signals (e.g., by increasing or decreasing amplitude) being provided to the speaker that is being used. In this way, a speaker that would otherwise be dormant is used to improve the sound quality provided by the speaker that is in use.

The specific operational details of the electronic device 100 of FIG. 1A are now described. Upon the electronic device 100 being powered on, the processor 102 begins executing the BIOS 122. The period during which the processor 102 executes the BIOS 122 is known herein as BIOS execution. During BIOS execution, a user of the electronic device may press a hotkey (e.g., F10 on a keyboard) to enter a BIOS setup mode. In the BIOS setup mode, the user may configure the port setting 110 to set the status of the speaker port 114 (and, by extension, the speaker communicably coupled with the speaker port 114) as a speaker or a microphone. In the BIOS setup mode, the user may configure the port setting 111 to set the status of the speaker port 116 (and, by extension, the speaker communicably coupled with the speaker port 116) as a speaker or a microphone. In this description, it will be assumed for the sake of illustration that the user configures the port setting 110 for the speaker port 114 as "microphone" and the port setting 111 for the speaker port 116 as "speaker." The port settings 110, 111 may, for example, comprise a single binary bit, which when set to 0 (or 1) indicates "microphone" and when set to 1 (or 0) indicates "speaker," Other alternatives are contemplated and included in the scope of this disclosure, BIOS execution may then resume.

In some examples, the port settings 110, 111 are user-configurable during BIOS execution, as described above. In some examples, however, the port settings 110, 111 are user-configurable during OS runtime, for example by execution of executable code (e.g., a utility) that provides the user the opportunity to configure the port settings 110, 111. In at least some examples, the electronic device 100 should be restarted after such OS runtime configuration of the port settings 110, 111 so that BIOS execution can occur and the port settings 110, 111 can take effect. The remainder of this description assumes that the port settings 110, 111 are user configured during BIOS execution as described above. While port settings (e.g., port settings 110, 111) and port attributes (e.g., port attributes 112, 113) are similar in that they both indicate a desired operation of a port (e.g., speaker or speaker operating as a microphone), port attributes differ from port settings in that port attributes may not be directly manipulated by users or by executable code (e.g., applications) during OS runtime. Rather, port attributes are accessible by BIOS during the boot up process. The BIOS may adjust a port attribute during boot up, and after the BIOS has launched the OS, the OS and other applications may read, but not write to, that port attribute.

After the user configures the port settings 110, 111 during BIOS execution, and once BIOS execution thereafter resumes, the BIOS 122 causes the processor 102 to read the port settings 110, 111 and to apply the port settings 110, 111 to port attributes 112, 113. In examples, the processor 102 applies the port settings 110, 111 to the port attributes 112, 113 during BIOS execution and before OS runtime. In examples, the processor 102 applies the port settings 110, 111 to the port attributes 112, 113 toward the end of BIOS execution but before OS runtime, for example, after any BIOS error beep codes have been audibly output by the electronic device 100 via either of the speakers. In examples, the processor 102 applies the port settings 110, 111 to the port attributes 112, 113 at any time during BIOS execution, regardless of whether BIOS error beep codes have been audibly output. After BIOS execution is complete, the processor 102 begins executing the OS 124, thus commencing OS runtime.

During OS runtime, the processor 102 executes the audio driver 126. The audio driver 126 is part of the executable code 108. The audio driver 126, when executed by the processor 102, causes the processor 102 to drive the speaker ports 114, 116 and their respective speakers. For purposes of this description, the audio driver 126 collectively represents the executable code 108 used to drive both the speaker ports 114, 116 and their respective speakers, but in some examples, separate audio drivers may be used as well.

As a result of executing the audio driver 126, the processor 102 reads the port attributes 112, 113. After reading the port attributes 112, 113, the processor 102 may store the port attributes 112, 113 in port attribute registers 118, 120, although in some examples, such registers may be omitted.

The remainder of this description assumes that the port attribute registers 118, 120 are included and used.

The processor 102 subsequently reads the values of the port attribute registers 118, 120 and operates the corresponding speaker ports 114, 116 (and, by extension, the corresponding speakers) accordingly. If, for instance, one of the port attributes indicates that the corresponding speaker port is to be used as a speaker, the processor 102 operates that speaker port (and corresponding speaker) as a speaker. If, however, one of the port attributes indicates that the corresponding speaker port is to be used as a microphone, the processor 102 operates that speaker port (and corresponding speaker) as a microphone. The processor 102 operating a speaker as a microphone includes the processor 102 collecting ambient noise data from that speaker as one would from a microphone or other audio input device. In some examples, the processor 102 determines the port attributes for multiple speaker ports and uses the determination when operating one of those multiple speaker ports. For example, the processor 102 may determine that the port attribute register 118 indicates that the speaker port 114 is to be operated as a microphone, but prior to operating the speaker corresponding to the speaker port 114 as a microphone, the processor 102 checks the port attribute register 120 to confirm that the corresponding port attribute indicates that the speaker corresponding to the speaker port 116 is to be used as a speaker. In this way, at least one speaker is consistently available to the user.

After collecting ambient noise data, the processor 102 uses the ambient noise data to modify audio output signals being provided to the other speaker that is not being used as a microphone. For instance, if speaker port 114 and its corresponding speaker are being used as a microphone, the processor 102 may collect ambient noise data from the ambient environment of the electronic device 100 via the speaker of the speaker port 114. This data may be stored, for example, in storage 106. Subsequently, the processor 102 may use the ambient noise data to modify audio output signals being provided to the speaker port 116 and its corresponding speaker. In examples in which more than two speakers are available, two or more such speakers may operate as microphones, and in such instances, more ambient noise data may be collected and used for more sophisticated audio output signal adjustments. Modifications to the audio output signal may include adjustments (increases or decreases) to amplitude, noise cancellation, echo cancellation, double talk detection, etc.

Figure 1B:
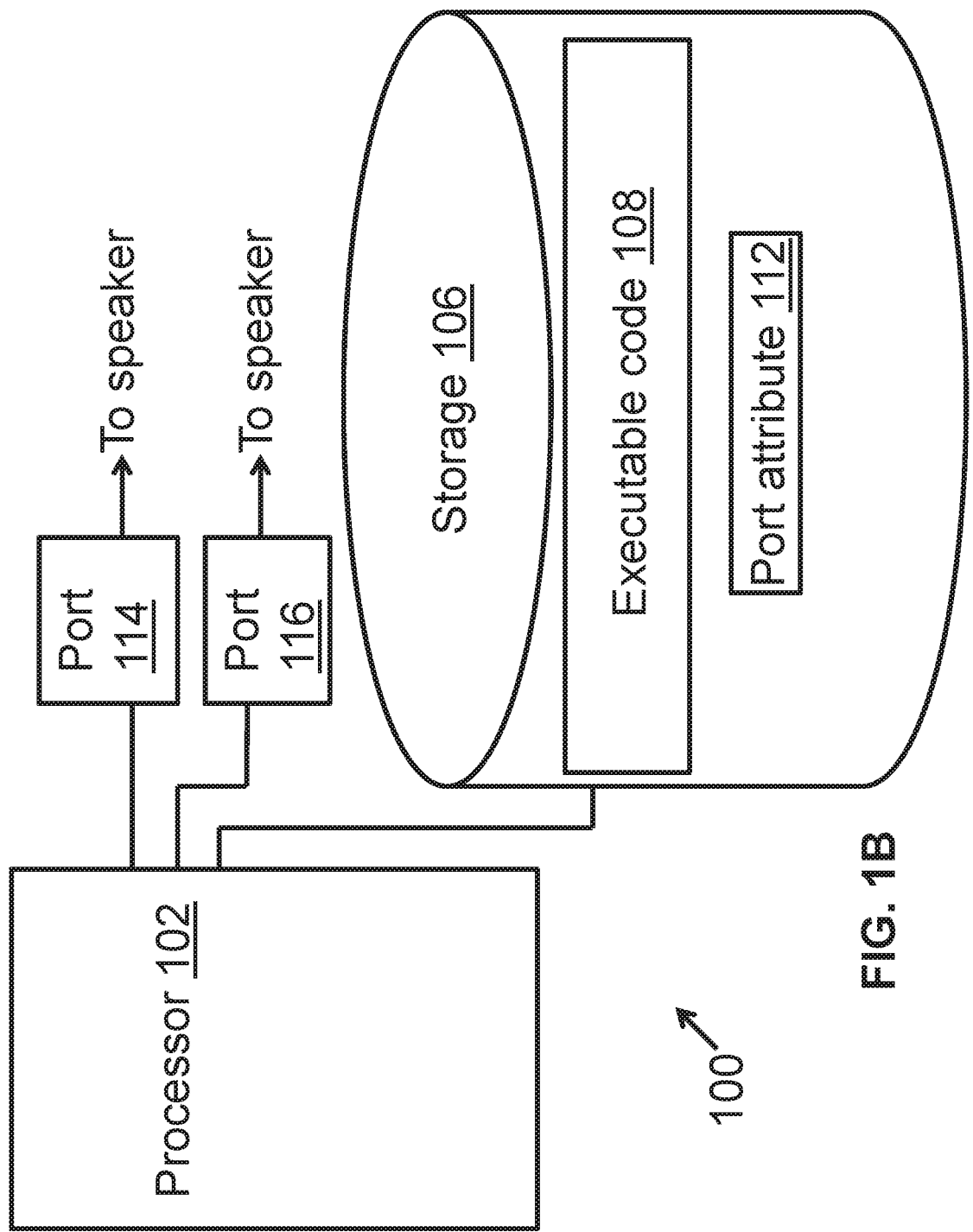

FIG. 1B is a simplified version of FIG. 1A. The electronic device 100 comprises the processor 102, the storage 106, and the speaker ports 114, 116, which are communicably coupled to corresponding speakers. The speakers may be internal to the electronic device 100 and/or external to the electronic device 100. The speakers may be coupled to the electronic device 100 using a wire or wirelessly. Storage 106 stores executable code 108 and the port attribute 112. The executable code 108 causes the processor 102 to perform the various actions attributed herein to the processor 102 and/or the electronic device 100. Although FIG. 1B is a simplified version of FIG. 1A, the operations of FIG. 3 may still be performed by the electronic device 100 of FIG. 1B. For example, the port attribute 112 may indicate the value of a user-configured port setting, and the processor 102 may operate the speaker port 114 and corresponding speaker as a microphone based on the value of the port attribute 112. The processor 102 may thereby collect ambient noise data from the speaker via the speaker port 114 and may use the ambient noise data to modify audio output signals provided to the speaker port 116 for output via the corresponding speaker.

Figure 1C:
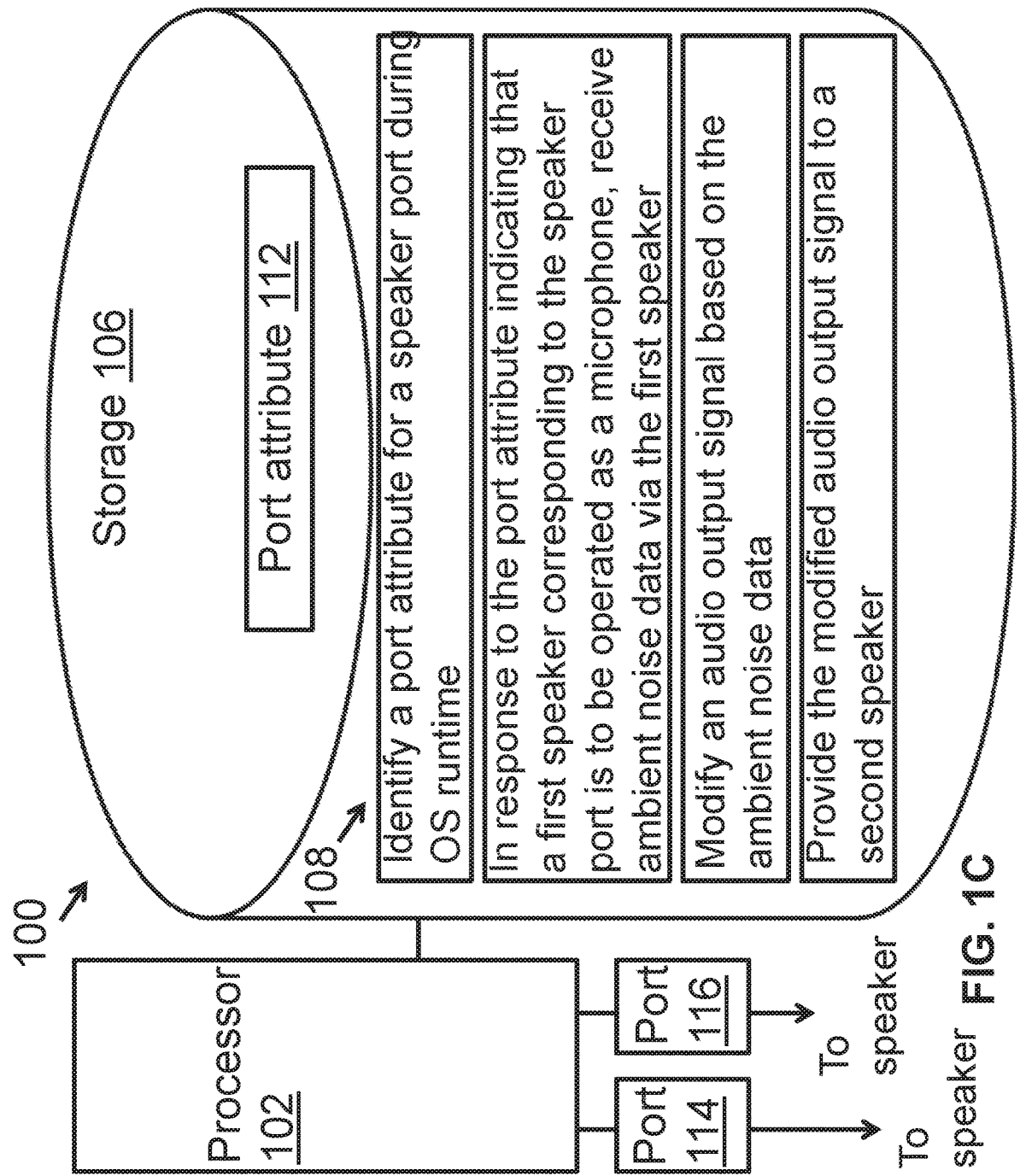

FIG. 1C is another simplified version of FIG. 1A. The components of the electronic device 100 specifically depicted in FIG. 1C match those of FIG. 1B, except that FIG. 1C specifically identifies some of the executable code 108 stored in storage 106. As shown, the executable code 108 includes instructions for the identification of a port attribute for a speaker port during OS runtime. The executable code 108 includes instructions for the receipt of ambient noise data via a first speaker corresponding to the speaker port in response to the port attribute indicating that the first speaker is to be operated as a microphone. The executable code 108 includes instructions for the modification of an audio output signal based on the ambient noise data. The executable code 108 includes instructions for the provision of the modified audio output signal to a second speaker. The executable code 108 as depicted in FIG. 1C is thus able to implement the method 300 of FIG. 3.

As explained above, the speakers may be internal to a chassis of the electronic device 100 (e.g., a built-in speaker that is built in to the chassis) and/or external to such a chassis. Accordingly, FIG. 2A depicts an electronic device 200 including a built-in speaker 217 that is built into a chassis 201 of the electronic device 200. FIG. 2A also depicts the existence of an external speaker that is external to the chassis 201, although the external speaker itself is not specifically depicted. The chassis 201 includes a processor 202 having properties matching those of the processor 102; storage 206 having properties matching those of the storage 106; a speaker port 214 having properties matching those of the speaker port 114; a speaker port 216 having properties matching those of the speaker port 116; executable code 208 having properties matching those of the executable code 108; BIOS 222 having properties matching those of the BIOS 122; OS 224 having properties matching those of the OS 124; an audio driver 226 having properties matching those of the audio driver 126; a port setting 210 having properties matching those of the port setting 110; a port attribute 212 having properties matching those of the port attribute 112; and a port attribute register 218 having properties matching those of the port attribute register 118. In addition, the chassis 201 comprises an audio output interface, which may be a transceiver or audio jack 221. The processor 102 uses an audio jack in case the external speaker is a wired speaker, and the processor 102 uses a transceiver in case the external speaker is a wireless speaker, for example, a wireless headset or headphones, wireless earbuds, a wireless desktop speaker, etc.

The operation of the electronic device 200 matches that of the electronic device 100 and thus is not repeated here except for a brief summary. The processor 202 performs at least some of its operations as a result of executing the executable code 208. Upon executing BIOS 222, the processor 202 permits the user to configure the port setting 210. During BIOS execution, the processor 202 reads the port setting 210 and applies it to the port attribute 212. The processor 202 then executes OS 224 to begin OS runtime. During OS runtime, the processor 202 reads the port attribute 212 and may store it in port attribute register 218. During OS runtime, and as a result of executing the audio driver 226, the processor 202 reads the port attribute register 218 and, based on its value, operates the speaker port 214 and the built-in speaker 217 as a microphone. In some examples, prior to operating the speaker port 214 and the built-in speaker 217 as a microphone, the processor 202 verifies that a port attribute corresponding to the speaker port 216 indicates that a corresponding speaker is to be operated as a speaker and not a microphone. In the event that both speaker ports correspond to port attributes indicating that the respective speakers are to be operated as microphones, the processor 202 may operate one of the speakers as a microphone and the other speaker as a speaker, thus overriding one of the port attributes. In this way, a speaker remains available to the user. The processor 202 collects ambient noise data via the built-in speaker 217 and the speaker port 214. The processor 202 may store this ambient noise data, e.g., in storage 206. The processor 202 uses the ambient noise data to modify audio output signals provided to the speaker port 216, for example, as described above. The audio signals may be provided to the external speaker via the transceiver/audio jack 221. FIG. 2B is a simplified version of FIG. 2A, and the operation of the electronic device 200 of FIG. 2B is consistent with that of the electronic device 100 of FIGS. 1A-1C, the electronic device 200 of FIG. 2A, and the method 300. Thus, the operation of FIG. 2B is not repeated here.

Figure 3:
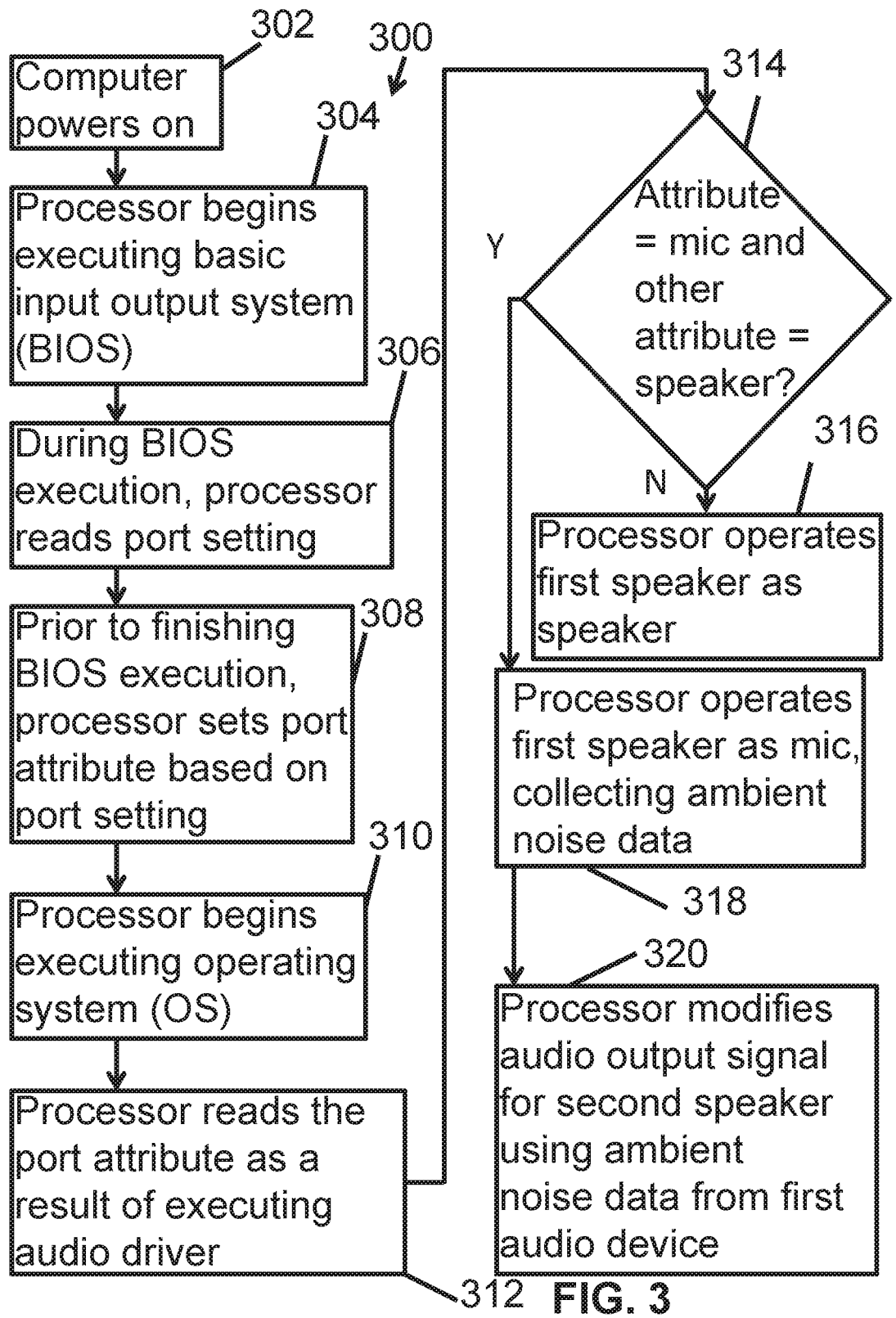
FIG. 3 is a flow diagram of a method for modifying audio signals using speaker-collected ambient noise, in accordance with various examples.

FIG. 3 depicts a flow diagram of an example method of operation 300 for the electronic devices 100 and 200. The method 300 begins with a computer powering on (302). The method 300 comprises a processor beginning execution of a BIOS (304). The method 300 comprises the processor reading a port setting during BIOS execution (306). The method 300 comprises the processor setting a port attribute based on the port setting and prior to finishing BIOS execution (308). The method 300 includes the processor beginning OS execution (310). The method 300 comprises the processor reading the port attribute as a result of executing an audio driver (312). The method 300 includes the processor determining whether the port attribute indicates a microphone and whether another port attribute (corresponding to another speaker port and a second speaker) indicates a speaker (314). If the port attribute does not indicate a microphone, or if the other port attribute does not indicate a speaker, the method 300 comprises the processor operating a first speaker corresponding to the port attribute as a speaker (316). Otherwise, if the port attribute indicates a microphone and the other port attribute indicates a speaker, the method 300 includes the processor operating the first speaker as a microphone and collecting ambient noise data through the first speaker (318). In addition, the method 300 comprises the processor modifying an audio output signal for the second speaker using ambient noise data collected via the first audio device (320).

In this specification and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B." In addition, when used herein including the claims, the word "approximately" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device comprising;
a first speaker port;
a second speaker port;
storage comprising a first port attribute corresponding to the first speaker port and a second port attribute corresponding to the second speaker port, the storage comprising executable code; and
a processor coupled to the first and second speaker ports and the storage,
wherein the processor, upon executing the executable code, is to:
collect ambient noise data using a first speaker corresponding to the first speaker port in response to the first port attribute indicating that the first speaker is to be used as a microphone and the second port attribute indicating that a second speaker corresponding to the second speaker port is to be used as a speaker;
modify an audio output signal using the ambient noise data collected using the first speaker; and
provide the modified audio output signal to the second speaker port.

2. The electronic device of claim 1, wherein the processor, upon executing the executable code, is to set the port attribute based on a port setting during basic input/output system (BIOS) execution.

3. The electronic device of claim 2, wherein the port setting is user-configurable during the BIOS execution.

4. The electronic device of claim 3, wherein the processor, upon executing the executable code, is to set the port attribute after causing the first speaker to output a BIOS error beep code.

5. The electronic device of claim 4, wherein the processor, upon executing the executable code, is to operate the first speaker as a microphone upon identifying the port attribute while executing an audio driver.

6. The electronic device of claim 1, wherein the first speaker is housed within a chassis of the electronic device.

7. The electronic device of claim 1, wherein the first speaker is external to the electronic device.

8. An electronic device, comprising:
a chassis;
a first speaker housed within the chassis;
a first speaker port housed in the chassis, the first speaker port coupled to the first speaker;
a second speaker port housed in the chassis;
storage housed within the chassis and comprising executable code; and
a processor coupled to the first and second speaker ports and the storage,
wherein the processor, upon executing the executable code, is to:
operate the first speaker as a microphone to collect ambient noise data in response to a first port attribute of the first speaker port indicating that the first speaker is to be operated as a microphone and a second port attribute of the second speaker port indicating that a second speaker corresponding to the second speaker port is to be operated as a speaker; and
modify an audio output signal based on the ambient noise data collected using the first speaker prior to providing the audio output signal to the second speaker port.

9. The electronic device of claim 8, wherein the processor, upon executing the executable code, is to set the first and second port attributes based on user-configurable port settings during basic input/output system (BIOS) execution.

10. The electronic device of claim 8, wherein the processor, upon executing the executable code, is to modify the audio output signal by adjusting an amplitude of the audio output signal.

11. A non-transitory computer-readable medium comprising executable code, which, when executed by a processor, causes the processor to:
identify a port attribute for a first speaker port during operating system (OS) runtime, the port attribute set during basic input/output system (BIOS) execution based on a user-configurable port setting, the port setting corresponding to the first speaker port;
in response to the port attribute indicating that a first speaker corresponding to the first speaker port is to be operated as a microphone, collect ambient noise data using the first speaker;
modify an audio output signal based on the ambient noise data collected using the first speaker; and
provide the modified audio output signal to a second speaker port corresponding to a second speaker.

12. The non-transitory computer-readable medium of claim 11, wherein the executable code, when executed by the processor, causes the processor to:
identify the port setting for the first speaker port during the BIOS execution, the port setting indicating whether the first speaker is to be operated as a microphone.

13. The non-transitory computer-readable medium of claim 12, wherein the executable code, when executed by the processor, causes the processor to:
set the port attribute based on the port setting prior to completion of the BIOS execution and after output of a BIOS error beep code.

14. The non-transitory computer-readable medium of claim 11, wherein the executable code, when executed by the processor, causes the processor to: collect ambient noise data using the first speaker in response to the port attribute indicating that the first speaker is to be operated as a microphone and a second port attribute indicating that a second speaker is to be operated as a speaker.

15. The non-transitory computer-readable medium of claim 11, wherein the first speaker is housed within a computer chassis, and wherein the second speaker is external to the computer chassis.

* * * * *